(12) United States Patent
Backman et al.

(10) Patent No.: US 6,861,003 B2
(45) Date of Patent: Mar. 1, 2005

(54) EDGE FILTER HAVING IMPROVED FLOW RATE

(75) Inventors: Sune Backman, Schaumberg, IL (US); Nicholas Maropis, Baden, PA (US)

(73) Assignee: Transor Filter USA, Inc., Elk Grove Village, IL (US)

( * ) Notice: Subject to any disclaimer, the term of this patent is extended or adjusted under 35 U.S.C. 154(b) by 54 days.

(21) Appl. No.: 10/223,876

(22) Filed: Aug. 20, 2002

(65) Prior Publication Data

US 2004/0035801 A1 Feb. 26, 2004

(51) Int. Cl.[7] .............................................. B01D 29/46
(52) U.S. Cl. .................. 210/741; 210/137; 210/323.2; 210/350; 210/488
(58) Field of Search ................................ 210/741, 767, 210/97, 137, 350, 351, 488, 780, 356, 323.2, 455, 459

(56) References Cited

U.S. PATENT DOCUMENTS

| | | | |
|---|---|---|---|
| 2,591,056 A | 4/1952 | Ericson | 210/181 |
| 2,692,686 A * | 10/1954 | Fleck et al. | 210/97 |
| 2,773,602 A | 12/1956 | Sylvester | 210/166 |
| 3,006,478 A | 10/1961 | Mueller | 210/356 |
| 3,179,116 A | 4/1965 | Jacobs | 134/56 |
| 3,207,311 A * | 9/1965 | Kasten | 210/137 |
| 3,214,368 A | 10/1965 | Muller | 210/23 |
| 3,334,748 A * | 8/1967 | Bozek | 210/132 |
| 3,543,542 A | 12/1970 | Bochan | 68/18 |
| 3,550,777 A | 12/1970 | Singleton | 210/91 |
| 3,622,003 A | 11/1971 | Czech et al. | 210/108 |
| 4,093,548 A | 6/1978 | Sterkenburg et al. | 210/180 |
| 4,361,489 A | 11/1982 | Kilsdonk et al. | 210/780 |
| 4,430,232 A | 2/1984 | Doucet | 210/798 |
| 4,435,287 A | 3/1984 | Sumimoto | 210/131 |
| 4,552,655 A * | 11/1985 | Granot | 210/108 |
| 4,591,436 A * | 5/1986 | Hofstede | 210/264 |
| 4,664,814 A * | 5/1987 | Backman et al. | 210/780 |
| 4,710,402 A | 12/1987 | Backman et al. | 427/244 |
| 4,740,315 A | 4/1988 | Backman | 210/771 |
| 4,804,481 A * | 2/1989 | Lennartz | 210/791 |
| 4,810,380 A | 3/1989 | Backman et al. | 210/488 |
| 4,927,547 A | 5/1990 | Backman | 210/771 |
| 5,207,930 A * | 5/1993 | Kannan | 210/791 |

FOREIGN PATENT DOCUMENTS

| | | |
|---|---|---|
| EP | 0 088 058 | 2/1983 |
| FR | 1343366 | 1/1963 |
| GB | 226274 | 12/1924 |
| GB | 1000263 | 6/1962 |
| SE | 205093 | 2/1983 |

* cited by examiner

Primary Examiner—Frank M. Lawrence
(74) Attorney, Agent, or Firm—Drinker Biddle & Reath LLP

(57) ABSTRACT

An apparatus according to the invention includes filter sticks housed within a pressure vessel. Each filter stick includes a plurality of filter disks stacked about a fluid-pervious tube with a hollow core and retained about the tube by a retainer at each end. The filter sticks are disposed within a first compartment having fluid to be filtered with the hollow core of the tube in fluid communication with a second compartment for filtrate. A compression regulator, which is responsive to pressure within the compartment, is linked to at least one of the retainers so as to control relative movement between the retainers, which controls compression of the disks and interstitial space for fluid to flow therebetween. In use, automated compression control of the disks compensates for the effect of particle build-up in the filter, which would otherwise decrease the rate of flow through the filter.

24 Claims, 4 Drawing Sheets

EDGE FILTER HAVING IMPROVED FLOW RATE

FIELD OF THE INVENTION

The invention relates to the field of edge filtering and is particularly well suited for use in filtering high viscosity fluids, such as oil, used in industrial grinding applications and electrical discharge machining ("EDM") processes. The invention is also effective in other filtration contexts.

BACKGROUND OF THE INVENTION

Apparatus and methods for edge filtering are known. As described in U.S. Pat. No. 4,664,814, a known edge filtering apparatus includes a number of filter sticks mounted within a pressure vessel divided into two compartments. Each filter stick includes a pervious tube, which is closed at one end. The closed end is disposed in a first compartment, into which fluid to be filtered is pumped under pressure. The opposite end is open, and in fluid communication with a second compartment for filtrate. A plurality of annular filter disks are stacked coaxially along the pervious tube. Pressurized fluid in the first compartment is forced through interstices between the filter disks into the tube and ultimately into the second compartment. The interstices trap particles to be filtered from the fluid.

In operation, the filter disks are compressed, such as by a spring or the like, along the axis of the tube. Axial compression of the stack controls the spacing between the disks so that particles will be trapped in the interstices between the disks during filtering, thereby preventing the particles from passing through to the tube. The more tightly the disks are pressed together, the smaller the particles that will be trapped between them. Where rough-surfaced disks are used, such as those described in U.S. Pat. No. 4,710,402, additional particles become trapped on the surfaces of the disks.

An interesting aspect of edge filtering is that filtering efficiency actually increases as more particles become trapped between or on the disks, because the trapped particles themselves help to filter additional particles. As particles build up, resistance to fluid flow through the filter increases, and fluid pressure builds up in the first compartment. The increased pressure further compresses the disks along the axis of the tube, further increasing resistance to fluid flow through the interstices. Under these conditions, the pump must force debris-laden fluid into the pressure vessel at increasing pressure to maintain a constant flow rate. Eventually, so many particles accumulate and compression of the filter disks is so great that efficiency begins to decrease, back pressure becomes undesirably high, and the filtering process must be shut down and the filter cleaned out, such as by reverse flushing.

It is not practical to increase the pump output pressure to maintain a constant flow rate through the edge filter. The pump output pressure is limited by the power of the pump, and as the maximum power limit is approached, the energy required by the pump becomes costly. Therefore, a way to maintain a constant flow rate through the filter, without stressing the pump, is needed.

In addition, known edge filtering methods can only be efficiently used with relatively low viscosity fluid. Even if the pump had enough power to initially force a high viscosity fluid through the conventional edge filter, the efficiency of the system would deteriorate rapidly because fluids of high viscosity compound the dynamics described above. Thus, a method of edge filtering high viscosity fluid is also needed.

SUMMARY OF THE INVENTION

The invention is directed to a method and apparatus for maintaining an approximately constant rate of fluid flow through an edge filter, without the need to substantially increase output pressure from the pump. The invention allows for longer filter cycles, (i.e., more time between back flushing) by maintaining an approximately constant flow rate. In addition, the invention allows for edge filtering of higher viscosity fluid than was previously possible by providing the ability to control the compression of the filter disks.

The apparatus includes one or more filter sticks mounted within a pressure vessel divided into first and second compartments. Each filter stick includes a pervious tube with a hollow core. The tube is closed at one end. The closed end is disposed in the first compartment, into which fluid to be filtered is pumped under pressure. The opposite end of the tube is in fluid communication with the second compartment for filtrate. A plurality of annular filter disks are stacked coaxially along the pervious tube. Pressurized fluid in the first compartment is forced through interstices between the filter disks into the core of the tube and ultimately into the second compartment. The filter disks are retained along the tube by a retainer at each end of the tube, such that relative movement of the retainers toward each other causes compression of the disks, reducing the interstitial space between them. A compression regulator is responsive to pressure within the first compartment, which in operation is the output pressure of the pump (as adjusted by any pressure regulator therebetween). The compression regulator is linked to one of the retainers to control relative movement between the retainers. Thus, axial disk compression is controlled and the effects on fluid flow caused by particle build-up in the interstices of the disks is alleviated.

BRIEF DESCRIPTION OF THE DRAWINGS

For the purpose of illustrating the invention, there are shown in the drawings forms which are presently preferred; it being understood, that this invention is not limited to the precise arrangements and instrumentalities shown.

DETAILED DESCRIPTION OF THE PREFERRED EMBODIMENTS

Figure 1:
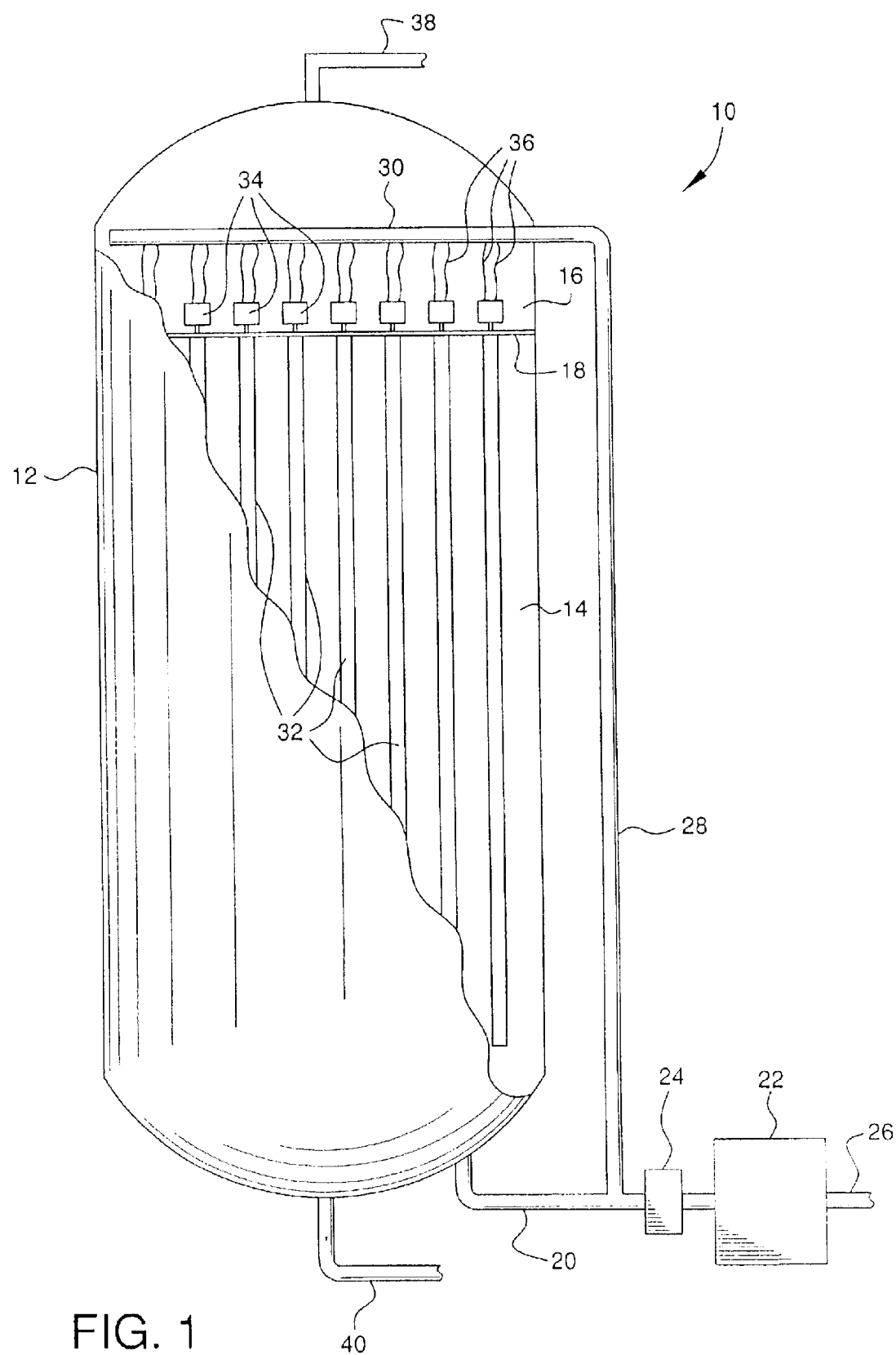
FIG. 1 is a partially cut away view of an edge filtering apparatus.

In the drawings, in which like numerals indicate like elements, there is shown an edge filtering apparatus 10 according to the present invention. The apparatus 10 includes a vessel 12, which is divided into a first compartment 14 and second compartment 16 by a fluid-impermeable and pressure-resistant partition 18. An input line 20 connects the first compartment 14 with the output port of a pump 22 through an optional pressure regulator 24. The pump 22 draws from a source (not shown) of fluid to be filtered through a pipe 26. Branching from the input line 20 is a pressure sampling line 28, which is in fluid communication with a manifold 30 mounted within the second compartment 16. As used herein, the terms "pump pressure", "output pressure from the pump" and the like are meant to be the pressure at the output of the pump as adjusted by any pressure regulator 24.

One or more filter sticks 32 are each mounted in the pressure vessel 12, substantially within the first compartment 14. Any desired number of filter sticks may be used. As described more fully below, each filter stick 32 has a hollow core, which is in fluid communication with the second compartment 16. Attached to each filter stick 32 is a compression regulator 34 mounted within the second compartment 16. Each compression regulator 34 is connected to the manifold 30 by at least one pressure tube 36. In the drawings, two such tubes 36 feed each compression regulator 34.

An output line 38 extends from the second compartment 16 and connects it with a filtrate reservoir (not shown). A debris removal pipe 40, connected to the bottom of compartment 14, is used during periodic back flushing cycles, which are known and need not be described in detail here. A valve normally closes the debris removal pipe 40 unless a back flushing cycle is running.

In use, fluid to be filtered, which has become laden with debris from, for example, an industrial machining or EDM process, is drawn into the pump 22 through the pipe 26. The debris-laden fluid is pumped through pressure regulator 24, if one is present, and then into first compartment 14 via input line 20. The input line 20 discharges into the lower portion of first compartment 14, which fills with debris-laden fluid under pressure from the pump 22. The pressure within the lower compartment 14, which during steady-state operation is the same as the output pressure of the pump 22, is communicated through the pressure sampling line 28 to the manifold 30, which, in turn, communicates the pressure to each compression regulator 34 through pressure tubes 36.

Figure 2:
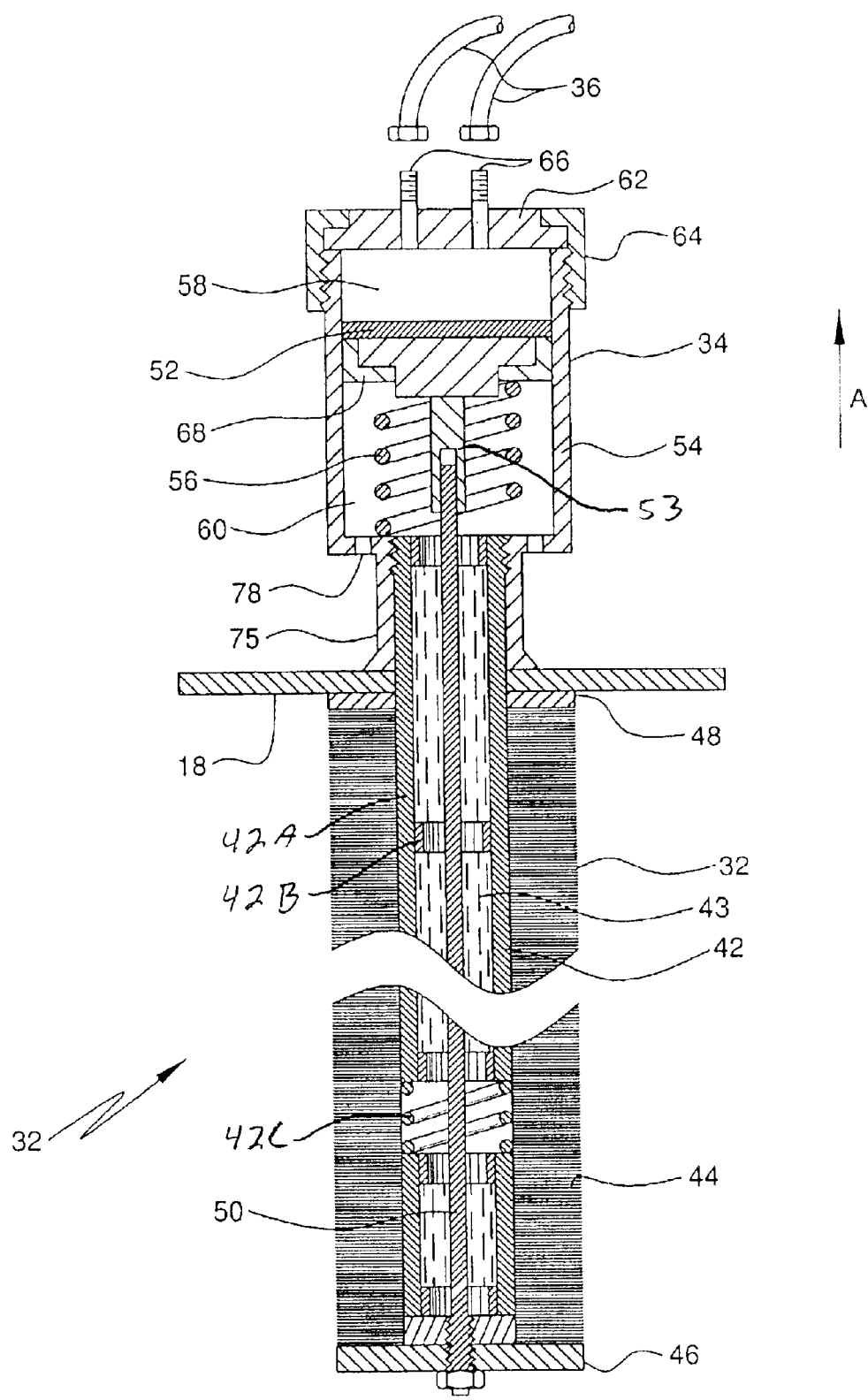
FIG. 2 is a cross-sectional view of a filter stick and compression regulator assembly according to the invention, as used in the apparatus of FIG. 1.

Filtering of the debris-laden fluid is performed by the filter sticks 32 mounted within the second compartment 16 of pressure vessel 12. As shown in FIG. 2, a filter stick 32 includes a fluid-pervious tube 42 with a hollow core 43, which is in fluid communication with the second compartment 16 at one end. Slots, perforations, or other openings in tube 42 enable fluid to pass through the wall of tube 42 into the hollow core 43. In one embodiment, the pervious tube 42 is formed from a piece of sheet metal 42A wrapped around a series of spaced apart rings 42B. The sheet metal is cut to a width so as not to wrap entirely around the rings 42B. Thus, a longitudinal gap is formed between the wrapped edges of the sheet metal, allowing fluid to flow into the hollow core 43. In this embodiment, the sheet metal is cut (or two shorter tubes are initially formed) and a spring 42C is interposed to allow the pervious tube 42 to elongate or shorten.

A plurality of annular filter disks 44 are stacked along substantially the entire portion of filter stick 32 situated within the first compartment 14. Although the number of disks 44 may vary, it is believed that 9,000 to 10,000 disks are optimum for a filter stick of length 90 cm. The filter disks are retained along the tube by a first retainer, such as but not limited to, a flange 46 at the first end of the filter stick. A second retainer, such as a flange 48, retains the disks 44 adjacent the second end. The second retainer may, but need not, be integral with the second end of filter stick 32. As can be seen in FIG. 2, relative movement of the flanges 46, 48 toward one another causes compression of the disks, reducing the interstices between the disks through which fluid can flow, and relative movement of the flanges 46, 48 away from one another increases those interstices.

To control relative movement of the flanges, a rigid rod 50 is disposed within the hollow core of the tube 42 and threadedly connected to a first end of the pervious tube and the first flange 46. A lock nut may also be provided to engage a portion of the rod 50 that extends through flange 46. A compression regulator 34 is threadedly engaged with the second end of tube 42 in the area of connection 75. The rod 50 extends the length of the tube 42, through the second end thereof, and into the compression regulator 34, thereby linking the compression regulator 34 with the flange 46. The compression regulator includes a piston 52 disposed within a housing 54. The end of the rod 50 opposite flange 46 is slideably associated with a guide 53, which is fixed to the piston 52. A spring 56 biases the piston 52 away from pervious tube 42 and rod 50 in the direction indicated by arrow A. The housing 54 defines and encloses a regulator chamber, which is divided into a pump-pressure portion 58 and a filtrate-pressure portion 60.

As shown in FIG. 2, a space exists between the end of the rod 50 and the piston 52. The size of the space is initially adjusted by threading more of the rod 50 through the first end of the pervious tube 42 adjacent flange 46. For example, if a highly viscous material is to be filtered, then less of the length of rod 50 is threaded through the first end of the viscous tube, making the space smaller. This initial calibration of the space will effect the sensitivity of the compression regulator. (As explained below, this space is designed to close due to piston displacement, given conditions during operation.)

A cap member 62 closes the pump-pressure portion 58 of the regulator chamber, for example by a threaded ring 64. One or more connector tubes 66 provide fluid communication through the cap member 62 between pressure tubes 36 and the pump-pressure portion 58. A seal 68 is provided around piston 52 to maintain fluid isolation between pump-pressure portion 58 and filtrate-pressure portion 60, so that fluid supplied by pressure tubes 36 does not leak into filtrate-pressure portion 60.

As noted above, each filter stick 32 is mounted substantially within the first compartment 14 of the pressure vessel 12. The rod 50 extends from the filter stick 32 into the compression regulator 34, which, as already noted, is mounted in the second compartment 16 of the pressure vessel 12.

In operation, each filter stick 32 and compression regulator 34 work as follows. As input line 20 discharges debris-laden fluid into the first compartment 14 of the pressure vessel 12, the debris-laden fluid surrounds the filter stick 32. The threaded end of the rod 50 acts as an initial assembly retainer by its engagement with the end of the pervious tube 42 and flange 46, thereby compressing the disks 44 between the flanges 46, 48. Depending on the viscosity of the fluid to be filtered, the initial compression can be adjusted by threading more or less of the length of rod 50 through the flange 46 relative to the end of pervious tube 42. The initial compression provides enough resistance to fluid flow through the interstices between disks 44 that pressure quickly builds up within the first compartment 14, creating a pressure differential across the wall of tube 42. The pressure differential forces fluid to flow through the interstices between the disks 44 and into the hollow core 43 of pervious tube 42. As fluid flows through the interstices, particles (i.e. debris) carried in the fluid become trapped at the outer edges of the disks. Additional particles may become trapped on the flat surfaces of the disks across which the fluid flows when rough-surfaced disks, such as paper, are used. As filtered fluid builds up in the hollow core 43 of tube 42, it flows out of core 43 through the filtrate portion 60 of the regulator chamber and one or more outlet openings 78 into the second compartment 16 of the pressure vessel 12.

As filtering continues, particles from the fluid become trapped at least at the edges of the disks (and possibly in the interstices). The particles interfere with fluid flow and cause greater resistance to further fluid flow. Thus, pressure within the first compartment increases as the pump continues to force fluid through input line 20. The resulting pressure increase in input line 20 is communicated to manifold 30 through pressure sampling line 28. The increase in pressure is, in turn, translated through pressure tubes 36 and pressure tube connectors 66 into the pump-pressure portion 58 of the compression regulator 34. The resulting increase in pressure within portion 58 displaces the piston 52 toward the pervious tube 42 and rod 50, in the direction opposite that indicated by arrow A. When the pressure reaches a predetermined level, the piston contacts rod 50. Through the linkage of rod 50 to flange 46, displacement of the piston 52 controls further movement of flange 46 toward flange 48, thereby controlling further compression of the disks 44. Thus, as pressure continues to build up in first compartment 14, axial compression of the disks 44 is controlled and an approximately constant flow rate is maintained.

As shown in the drawings, the surface area of piston 52 is approximately that of flange 46 so that the force exerted by pump pressure on both piston 52 and flange 46 is approximately the same. It is also possible to make the regulator housing and piston wider than the flange 46. In that case, greater force can be exerted on the piston 52, thereby tending to decompress the disks 44 when the piston 52 contacts the rod 50. This decompression enlarges the interstices between the disks, which allows more fluid to pass through the interstices and into the hollow core of pervious-tube 42. As a result, as fluid pressure in first compartment 14 increases, mechanical compressive force on the filter disks 44 decreases, and fluid flow across the filter disks is maintained at a controlled rate.

Filtrate-pressure portion 60 of the regulator chamber is open to the second compartment 16 of the pressure vessel at the apertures 78. Therefore, pressure exerted by the filtrate, which builds up and eventually forces filtrate out of the compartment 16 through outlet pipe 38, opposes the movement of piston 52 in the direction opposite that of arrow A. However, the opposing force is overcome by the pump-pressure within portion 58 because there will always be a pressure drop across the filter disks 44 during the filtering process. However, should an application of the invention require less resistance to movement of piston 52, apertures 78 may be replaced with tube connectors and tubes (not shown) leading to a source of pressure other than compartment 16. In that case, apertures (not shown) may be provided in the area of connection 75 to allow fluid flow from the hollow core 43 directly to the second compartment 16.

Figure 3:
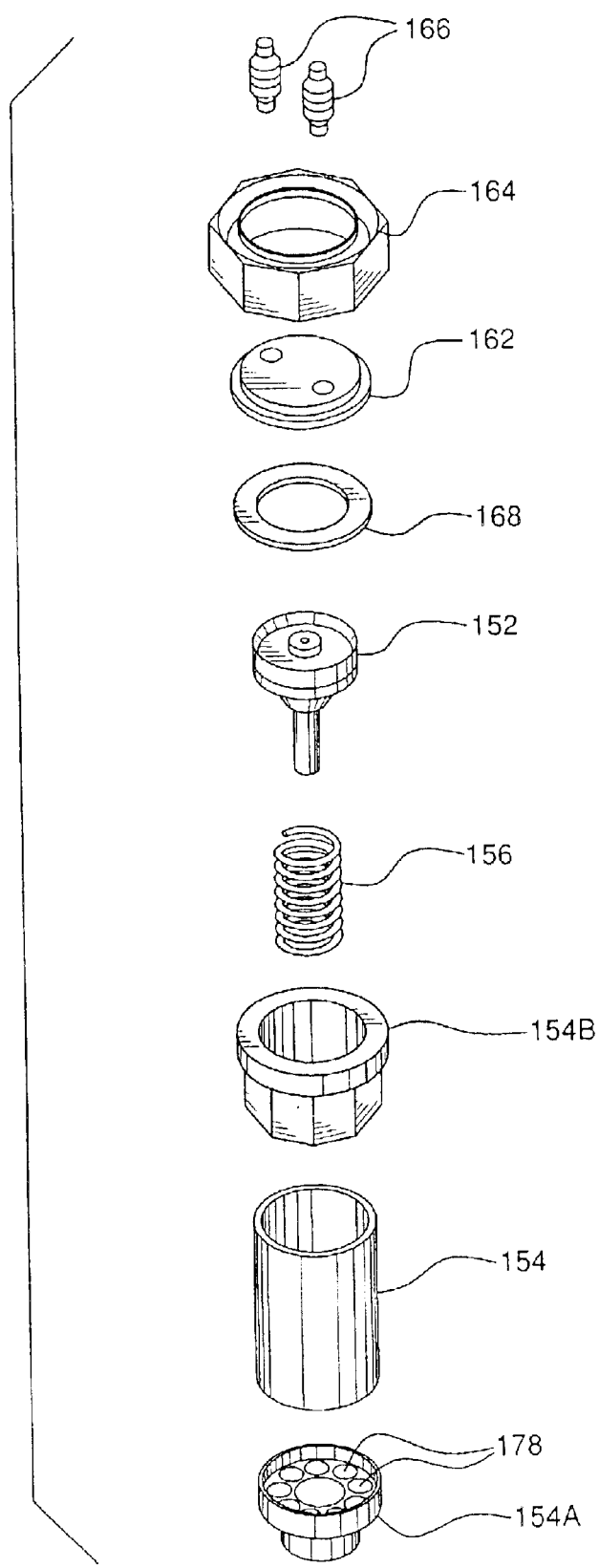
FIG. 3 is an exploded isometric view of a preferred form of a compression regulator according to the embodiment of FIG. 2.

FIG. 3 shows an exploded view of a preferred form of the piston-type compression regulator shown in FIG. 2 and described above. The parts of the compression regulator include a bottom flange 154A with apertures 178 (the flange 154A being analogous to the connection 75 in FIG. 2). The bottom flange is adapted to receive a pipe 154, which is inserted at its opposite end into an externally threaded cap 154B. Into the open end of cap 154B is inserted a spring 156 and piston 152. Tube connectors 166 are secured through holes in cap 162, which, along with washer 168, is juxtaposed with cap 154B. An internally threaded ring is engaged with the threads of cap 154B to securely retain the assembled compression regulator.

Figure 4:
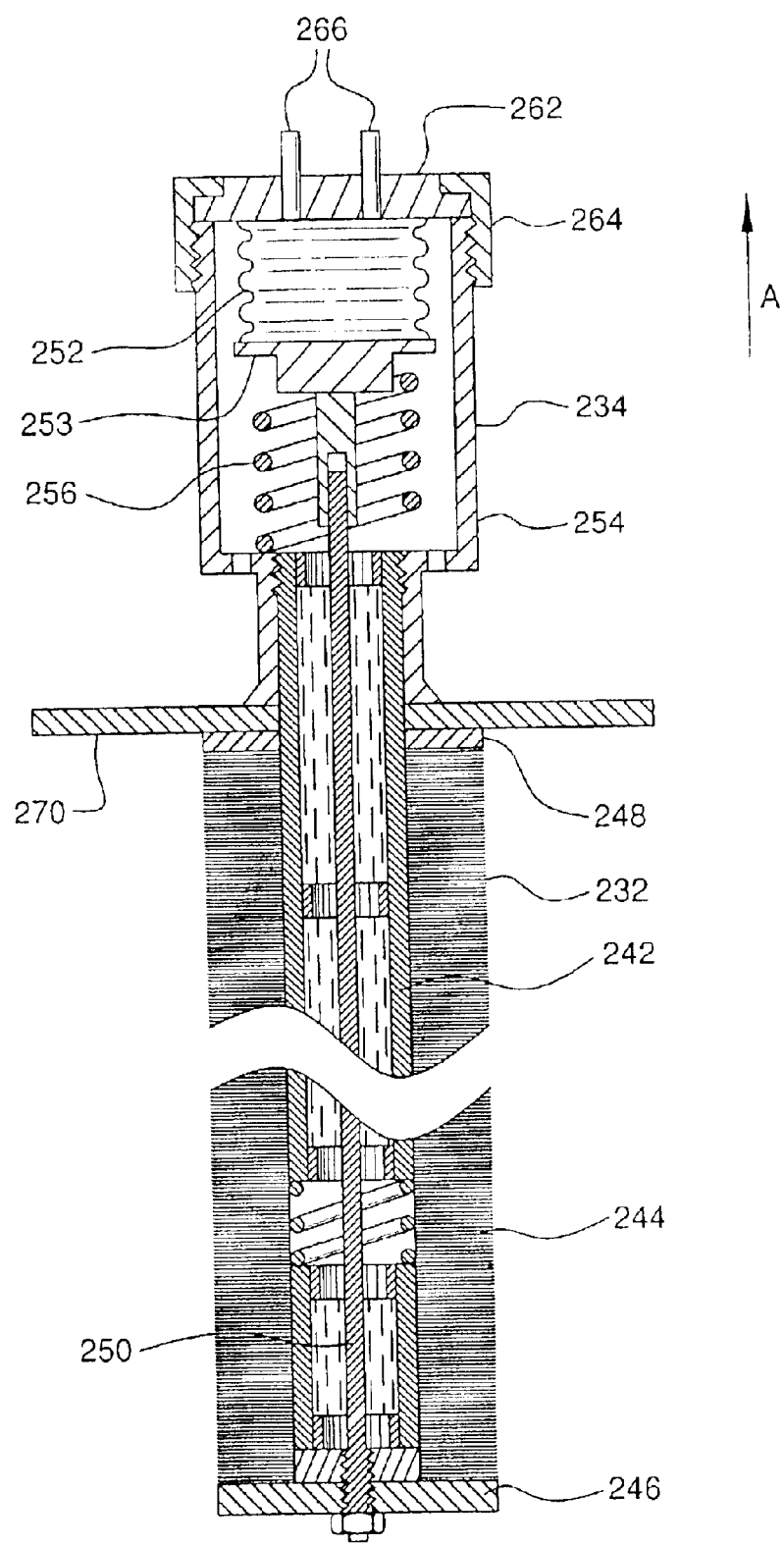
FIG. 4 is a cross-sectional view of a filter stick assembled with a second embodiment of a compression regulator according to the present invention.

The present invention is not limited to the piston-type regulators heretofore described. FIG. 4 provides an example of another embodiment of the invention. Rather than a piston, a bellows 252 is the pressure responsive element of this embodiment. One skilled in the art will recognize that many of the elements of this embodiment function in a fashion similar to the analogous elements of FIG. 2 described above. However, some distinctions are noted here. First, tube connectors feed fluid at pump pressure into the bellows 252, rather than into pump-pressure portion 58 as in the embodiment of FIG. 2. A rigid plate 253 at the end of the bellows securely engages the rod 250 and also contacts the spring 256. The spring 256, which may be omitted if the bellows 252 is self-biasing, biases the plate 253 in the direction of arrow A.

The incorporation of the bellows permits certain modifications to other elements of the compression regulator, as it is shown in FIG. 2, as well. The housing 254 may be permeable to liquid and, in fact, need not be a housing at all. Rather, the housing 254 may be replaced by a simple bracket to retain the bellows adjacent tube connectors 266. In that case, cap 262 and ring 264 may be dispensed with entirely. In addition, provided the housing 254 is otherwise permeable to fluid, no apertures, such as apertures 78 in FIG. 3, are required. It is also noteworthy that the housing 254 is not divided by a piston into higher and lower pressure chambers. Instead, the interior of the bellows 252 contains the fluid under pump pressure, while the volume outside the bellows is at filtrate-pressure.

The remaining elements of the bellows-type embodiment perform similar functions as the analogous elements of the piston type embodiment shown in FIG. 2. Flanges 246 and 248 retain and variably compress the filter disks 244 by moving relative to one another. Rod 250 controls the movement of flange 246 relative to flange 248 by transmitting pressure response, in the form of axial expansion, by the bellows 252.

Various other modifications to the hydraulic and mechanical means described above will also be apparent from the disclosure provided herein. For instance, electro-mechanical devices (not shown) may be used. An electronic pressure sensor may be placed within the compartment 14 or in-line on input line 20 of FIG. 1. In such an embodiment, regulator line 28 and manifold 30 may be eliminated. In their stead, electrical signals may be sent from the pressure sensor to a controller for controlling a solenoid or the like within compression regulators 34. Such a device would, in turn control the compression of the disks via a linkage to one of the above-described flanges.

Of course, many further modification to the embodiments described herein will also be apparent given the present disclosure. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. Filtering apparatus, comprising
   (a) a vessel having first and second compartments divided by a partition and having a fluid inlet for admitting fluid to be filtered into the first compartment and a fluid outlet for discharging filtered fluid from the second compartment,
(b) at least one filter element, comprising
(i) a pervious tube extending through the partition having a hollow core, one end of the tube being closed and the other open, the open end being in communication with the second compartment, the tube being located substantially within the first compartment, and
(ii) a plurality of annular filter elements stacked coaxially along the portion of the tube within the first compartment and retained thereon under compression by a retainer at each end of the tube,
(c) a compression regulator linked to at least one retainer and responsive to pressure of fluid admitted into the first compartment, the retainer being movable along an axis of the tube in a direction to further compress the stacked filter elements and the compression regulator controlling the movement of the retainer when the pressure of fluid admitted into the first compartment increases beyond a preselected pressure.

2. Filtering apparatus according to claim 1, further comprising the compression regulator being in communication with the first compartment through a conduit connecting the compression regulator and the first compartment.

3. Filtering apparatus according to claim 2, wherein the compression regulator comprises a chamber and a piston movable within the chamber in response to pressure changes in the first compartment.

4. Filtering apparatus according to claim 3, wherein the compression regulator further comprises a biasing member for biasing the piston to a position which allows the retainer to move freely when the pressure in the first compartment is below the preselected pressure.

5. Filtering apparatus according to claim 3, wherein the compression regulator is linked to the at least one retainer by a rod.

6. An edge filtering apparatus comprising:
a first compartment with an input line and a second compartment with an output line, the first and second compartments divided by a partition;
one or more filter sticks substantially disposed in the first compartment, each filter stick comprising
a plurality of filter disks stacked about a pervious tube, the disks being compressed between a first and second retainer,
the pervious tube extending through the partition having a hollow core in fluid communication with the second compartment;
the filter sticks providing fluid communication between the first and second compartments through the hollow core and interstices between the disks; and
a compression regulator responsive to pressure in the first compartment, the compression regulator being linked with the first retainer so as to selectively prevent compression of the disks in response to pressure changes in the first compartment.

7. The apparatus of claim 6 further comprising a pump connected to the input line for discharging debris-laden fluid into the first compartment.

8. The apparatus of claim 7 wherein the compression regulator comprises a housing defining a regulator chamber, a piston mounted within the housing so as to divide the regulator chamber into a pump-pressure portion and a filtrate-pressure portion, the piston moving in response to pressure changes in the pump-pressure portion.

9. The apparatus of claim 8 wherein the compression regulator further comprises a biasing member for biasing the piston to a position that allows free movement of the retainer.

10. The apparatus of claim 9 wherein the compression regulator is linked to the first retainer by way of a rod threadedly engaged with the first retainer.

11. The apparatus of claim 10 wherein a compression regulator mounted within the second compartment is engaged with each of the filter sticks, the rod engaged with the retainer of each extending through the hollow core of the filter stick into the compression regulator.

12. The apparatus of claim 9 wherein the pump-pressure portion is in fluid communication with the input line through a regulator line and a manifold.

13. The apparatus of claim 7 wherein the compression regulator comprises a bellows in fluid communication with the input line.

14. An edge filtering apparatus comprising:
means for inputting debris-laden fluid into a first compartment;
means for edge filtering the debris-laden fluid, said means including a plurality of filter disks;
means for transferring the filtered fluid to a second compartment, the transferring means extending through a partition dividing the first and second compartments;
means for compressing the edge filtering means;
means for controlling the compressing means in response to pressure changes in the first compartment; and
means for outputting filtered fluid from the second compartment.

15. The apparatus of claim 14 wherein the controlling means is a piston mounted within a housing and a mechanical linkage between the piston and the compression means.

16. The apparatus of claim 14 wherein the controlling means is a bellows and a mechanical linkage between the bellows and the compression means.

17. A method of maintaining an approximately constant flow rate through an edge filter, the method comprising the steps of:
a) providing a filter assembly including a pressure vessel having a first and a second compartment separated by a partition, a plurality of filter disks placed around a pervious hollow core, the core being located within the vessel and extending from the first compartment to the second compartment through the partition, the filter disks being axially displaceable about the core, and the individual filter disks having an original height and being compressible and decompressible so that the interstices between the individual filter disks becomes increased and decreased as needed to maintain an approximately constant flow rate through the vessel by application and removal of axial compression;
b) applying a first axial compression force to the filter disks with a compression applicator;
c) passing fluid through the filter assembly such that particles filtered from the fluid tend to have effects on the fluid, the effects including a decreased rate of fluid flow and an increased fluid pressure within the vessel, the increased pressure providing a second axial compression force to the plurality of filter disks that further decreases the rate of fluid flow;
e) sensing the pressure within the vessel with a compression regulator linked to the compression applicator; and f) controlling the second axial compression force as needed to compensate for the effects of particles filtered from the fluid so as to maintain an approximately constant flow rate through the filter assembly.

18. An edge filtering apparatus comprising:

a pressure vessel divided by a partition into a first compartment with an input for debris-laden fluid and a second compartment having an output for filtered fluid;

a plurality of filter sticks mounted on the partition, each filter stick comprising, a pervious tube with a hollow core extending through the partition, the tube having an open end in fluid communication with the second compartment, and a closed end in the first compartment, and a plurality of disks stacked about the tube within the first compartment, the disks being compressed between first and second flanges;

a compression regulator mounted on each of the filter sticks, each compression regulator including a member responsive to pressure in the first compartment;

a linkage between the compression regulator and the first flange, the linkage controlling relative movement between the first and second flanges.

19. The apparatus of claim 18 wherein each pressure regulator further comprises, a housing defining a regulator chamber, a piston mounted within the housing, the piston dividing the regulator chamber into a pump-pressure portion and a filtered-pressure portion, and a biasing member for biasing the piston toward the pump-pressure portion, the pump-pressure portion being in fluid communication with the first compartment.

20. The apparatus of claim 19 wherein the linkage comprises a rod connecting the piston and the first flange when pressure within the pump-pressure portion exceeds a preselected pressure.

21. The apparatus of claim 18 wherein each pressure regulator comprises a bellows having an expandable interior in fluid communication with the first compartment.

22. The apparatus of claim 21 wherein a first end of the bellows is mounted in a fixed position relative to the second flange, the bellows being expandable toward the first flange.

23. The apparatus of claim 22 wherein the compression regulator further comprises a biasing member that opposes expansion of the bellows.

24. The apparatus of claim 21 wherein the linkage comprises a rod connecting the bellows and the first flange when pressure within the pump-pressure portion exceeds a preselected pressure.

* * * * *